Feb. 6, 1962   S. M. PATTILLO   3,019,945
STOCK FEED PELLET SPREADER
Filed April 4, 1960   2 Sheets-Sheet 1

INVENTOR
Sidney M. Pattillo

BY
ATTORNEY

Feb. 6, 1962 S. M. PATTILLO 3,019,945
STOCK FEED PELLET SPREADER
Filed April 4, 1960 2 Sheets-Sheet 2
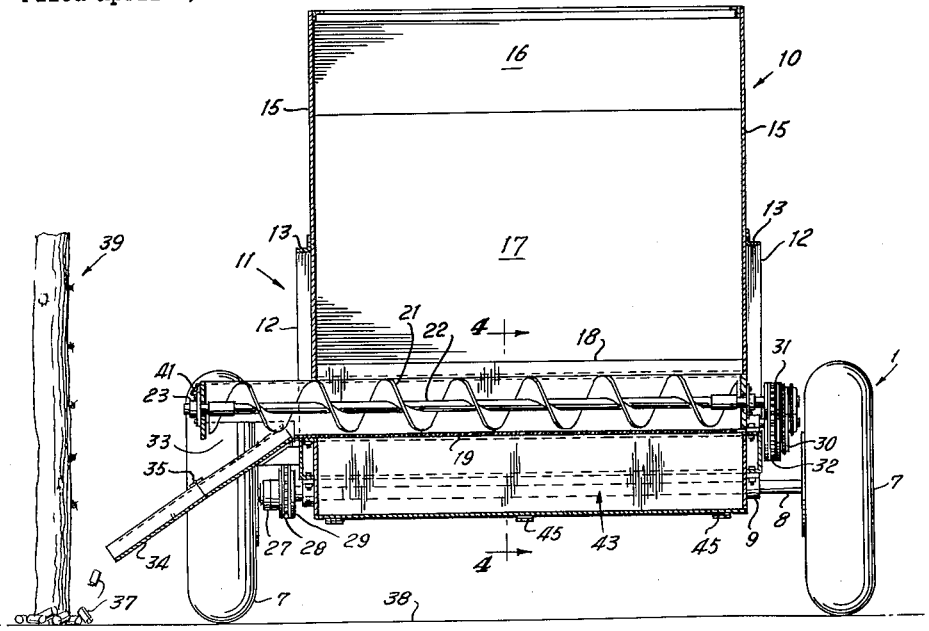
Fig. 3
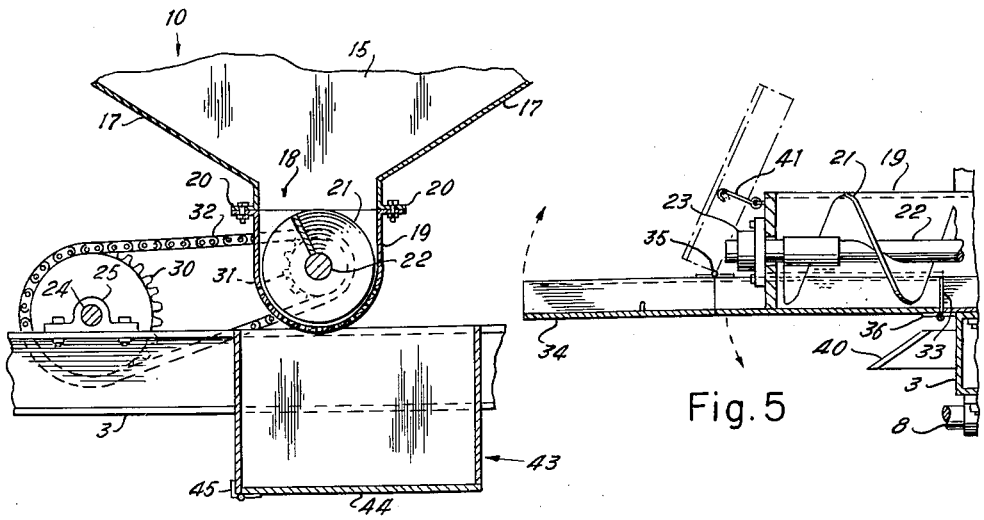
Fig. 4
Fig. 5
INVENTOR
Sidney M. Pattillo
BY
ATTORNEY

United States Patent Office 3,019,945
Patented Feb. 6, 1962

3,019,945
STOCK FEED PELLET SPREADER
Sidney M. Pattillo, Rosebud, Tex.
(Rte. 3, Box 194J, Lubbock, Tex.)
Filed Apr. 4, 1960, Ser. No. 19,877
1 Claim. (Cl. 222—177)

This invention relates to a stock feed pellet spreader, and it concerns more particularly a wheeled device, adapted to be towed, for use in spreading stock feed, in the form of extruded pellets or cubes, on the ground along a fence line.

The pellets, when deposited on the ground along a wire fence, are accessible from either side of the fence.

By arranging the pellets along a fence line, the pellets are protected by the fence against the stock treading thereon, and from contamination due to the presence of the stock milling about, whereby loss of the feed is avoided.

Use of the stock feed pellet spreader of the invention permits the feed to be spread along a fence line at a rapid rate, whereby the spreader is soon out of the way and the feeding animals are caused to line up along the fence in an orderly manner, in side by side relation to each other, rather than following one behind another as the feed is deposited on the ground, so that each animal receives its share of the feed.

The invention will be readily understood by referring to the following description and the accompanying drawing, in which:

FIG. 3 is a sectional elevational view taken on the line 3—3 of FIG. 1, showing the discharge chute in its extended position and showing a wire fence positioned adjacent one side of the spreader and having a plurality of stock feed pellets arranged upon the ground along the fence line as discharged from the chute;

FIG. 4 is a fragmentary sectional elevational view, on an enlarged scale, taken on the line 4—4 of FIG. 3; and FIG. 5 is a fragmentary view, on an enlarged scale, showing a portion of the apparatus illustrated in FIG. 3, and showing the discharge chute in a partly retracted position.

Figure 1:
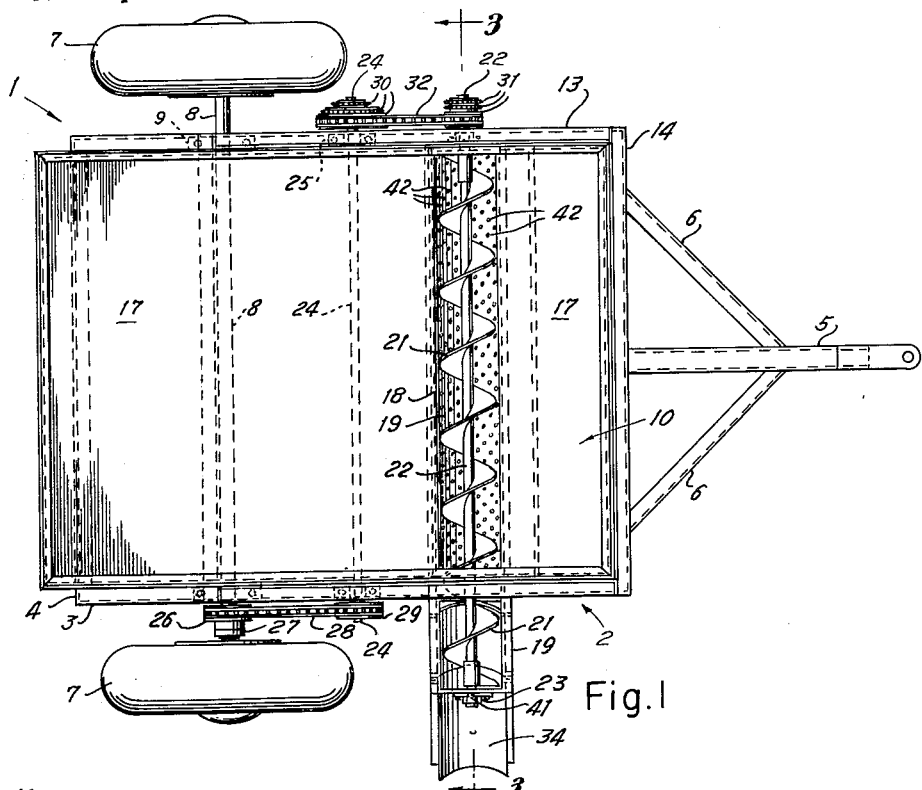
FIG. 1 is a top plan view of a stock feed pellet spreader embodying the invention.
Figure 2:
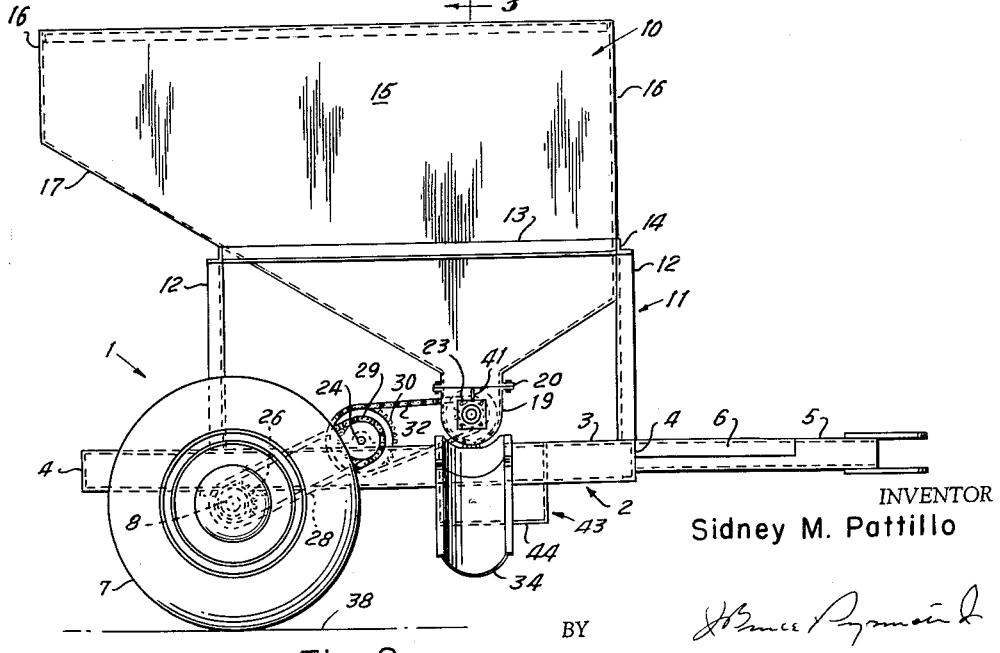
FIG. 2 is a side elevational view.

Referring to the drawing, the stock feed pellet spreader of the invention includes a wheeled vehicle, adapted to be towed, which is indicated generally by the numeral 1.

The vehicle 1 has a rectangular frame, designated generally by the numeral 2, which may be of any suitable construction and which as shown consists of a pair of side rails 3 and a pair of end rails 4.

A tongue 5, which is connected at one end to one of the end rails 4 and extends forwardly therefrom, is adapted to be connected at its opposite end to a suitable towing vehicle. A pair of diagonal braces 6 are connected at their ends to opposite sides of the tongue 5 and to the adjacent end rail 4.

The frame 2 is supported on a pair of wheels 7, which are mounted on opposite ends of an axle 8 and are rotatable therewith. The axle 8 is journaled in bearings 9 carried by the side rails 3.

A hopper 10, which is generally rectangular and is substantially coextensive with the frame 2, is supported above the frame 2 on a sub-frame 11, which may be of any suitable construction and which as shown consists of two pairs of corner posts 12, which extend upwardly from the respective side rails 3, and a pair of side rails 13 and a pair of end rails 14 which are connected to the upper ends of the corner posts 12.

The hopper 10 has a pair of side walls 15 and a pair of end walls 16. A pair of inclined, downwardly converging bottom portions 17, which are connected to opposite end walls 16, terminate at their lower edges in an elongated bottom opening 18 which is arranged transversely of the hopper 10 and is coextensive with the width thereof.

An elongated trough 19 is positioned below the hopper 10, in alignment with the elongated opening 18, and is connected by flanges 20 to the adjacent edges of the bottom portions 17.

The trough 19 is longer than the width of the hopper 10 and extends substantially beyond one side thereof. The extended end portion of the trough 19 terminates at a point which is substantially in alignment with the outer extremity of the adjacent wheel 7.

A screw conveyor 21, which is mounted on a shaft 22 and is rotatable therewith, is operatively positioned within the trough 19. The shaft 22 is journaled in bearings 23 carried by the ends of the trough 19, which are closed.

A shaft 24, which is arranged transversely of the frame 2, parallel to the axle 8 and the shaft 22, is journaled in bearings 25 carried by the side rails 3.

A sprocket 26, which is journaled on the axle 8, is operatively connected to the axle 8 by a clutch 27 whereby the sprocket 26 is adapted to be rotated with the axle 8 upon engagement of the clutch 27.

The sprocket 26 is connected by a chain belt 28 to a sprocket 29, which is mounted on the shaft 24 and turns therewith, whereby the shaft 24 is adapted to be rotated in response to rotation of the wheels 7 and the axle 8, upon engaging the clutch 27 as above described.

A series of sprockets 30, which are of progressively increasing diameter, are mounted on the shaft 24 and turn therewith. A corresponding series of sprockets 31 are mounted on the shaft 22, opposite the sprockets 30, and turn therewith.

The sprockets 30 and 31 are selectively engageable by a chain belt, such as the chain belt 32, whereby the screw conveyor 21, which is adapted to be driven by the shaft 24, is rotatable at selected speeds relative to the speed of rotation of the shaft 24.

A bottom opening 33 is provided in the extended end portion of the trough 19, below the adjacent end of the screw conveyor 21, which comprises the discharge end thereof.

An articulated discharge chute 34, which has its opposite end portions connected by a hinge 35, is connected at one end, by a hinge 36, to the bottom of the trough 19, inwardly of the bottom opening 33.

In its extended position, as shown in FIG. 3, the discharge chute 34 is inclined downwardly and outwardly, and extends outwardly beyond the adjacent wheel 7, whereby it is adapted to deposit stock feed pellets, some of which are indicated by the numeral 37, on the ground, designated by the numeral 38, along a fence line such as the adjacent wire fence 39.

The chute 34 is adapted to be supported in its extended position by engagement with an abutment 40 which extends outwardly from the adjacent side rail 3.

In its retracted position the chute 34 is adapted to be folded upwardly over the adjacent end of the trough 19, as indicated in FIG. 5, whereby the chute 34 does not extend outwardly beyond the adjacent wheel 7 and one of its end portions forms a closure for the bottom opening 33.

The chute 34 is adapted to be secured in its retracted position by fastening devices such as the hook 41.

The bottom of the trough 19 is perforated, as at 42, and an elongated rectangular box 43, which is positioned below the trough 19, is adapted to receive broken, comminuted, finely divided particles of the material of the stock feed pellets 37 which may pass thru the perforations 42.

The bottom of the box 43, indicated by the numeral 44, is hinged along one of its side edges, as at 45, whereby the contents of the box 43 may be readily discharged therefrom.

In the operation of the stock feed pellet spreader above described, a quantity of the stock feed pellets 37 is placed in the hopper 10, and the wheeled vehicle 1 is attached to a suitable towing vehicle (not shown) whereby it is drawn along a fence line, such as the wire fence 39, with the chute 34 in its extended position whereby the pellets 37 are deposited on the ground 38 along the fence line as the vehicle 1 advances.

The clutch 27 is engaged, whereby the shaft 24 is driven by the wheels 7 and the axle 8 and the screw conveyor 21, which is mounted on the shaft 22, is rotatable in response to rotation of the shaft 24.

The rate of delivery of the pellets 37, as the wheeled vehicle 1 is advanced along the fence line, is determined by the speed of rotation of the screw conveyor 21.

The shaft 22, which carries the screw conveyor 21, is adapted to be rotated at selected speeds, relative to the speed of rotation of the shaft 24, by selective engagement of a chain belt such as the chain belt 32 with the sprockets 30 and 31, as above described.

The invention may be modified in various ways without departing from the spirit and scope thereof.

An automotive type transmission (not shown) may be substituted for the sprockets 30 and 31 and the chain belt 32 if desired.

I claim:

A stock feed pellet spreader comprising a wheeled vehicle, adapted to be towed, including a frame, an axle extending outwardly beyond opposite sides of the frame, and a pair of wheels mounted on opposite ends of the axle and rotatable therewith, a hopper supported on the frame, between the wheels, having an elongated bottom opening coextensive with its width arranged parallel to the axle, an elongated trough positioned below the hopper, in alignment with the elongated opening thereof and communicating therewith, the trough extending substantially beyond one side of the hopper and terminating at a point opposite the adjacent wheel, the trough being closed at its ends and having a bottom opening in its extended end portion, a conveyor screw operatively positioned within the trough and having its shaft journaled in the ends thereof, drive means including clutch and transmission means operatively connecting the conveyor shaft to the axle whereby the conveyor shaft is adapted to be rotated at selected speeds relative to the speed of rotation of the axle, and an articulated chute conforming to the bottom of the trough having a first section pivotally connected at one end to the bottom of the trough, inwardly of the opening therein, and movable pivotally from a first position, in which it forms a closure for said opening, to a second position in which it is inclined downwardly and outwardly below it, the chute having a second section pivotally connected at one end to the outer end of the first section and movable pivotally from a first position, corresponding to the first position of the first section, in which the second section is folded upwardly over the adjacent end of the trough, to a second position, corresponding to the second position of the first section, in which the second section is inclined downwardly and outwardly from the first section, in longitudinal alignment therewith, the length of the respective sections being such that in their last mentioned positions the chute extends downwardly and outwardly substantially beyond the adjacent wheel.

References Cited in the file of this patent

UNITED STATES PATENTS

| 70,896 | Pulse | Nov. 12, 1867 |
| 731,243 | Swilling | June 16, 1903 |
| 750,726 | Stevens | Jan. 26, 1904 |
| 878,536 | Kennebrew | Feb. 11, 1908 |
| 1,614,870 | Bruce | Jan. 18, 1927 |
| 2,767,963 | Ringen et al. | Oct. 23, 1956 |
| 2,827,204 | McCurdy | Mar. 18, 1958 |

FOREIGN PATENTS

| 673,266 | Great Britain | June 4, 1952 |